United States Patent [19]

Hicks et al.

[11] Patent Number: 4,640,696

[45] Date of Patent: Feb. 3, 1987

[54] APPARATUS FOR CLEANING AND CONDITIONING GAS

[75] Inventors: Roger J. Hicks, Lakewood; John W. Hufgard, Novelty, both of Ohio

[73] Assignee: Bessam-Aire, Inc., Cleveland, Ohio

[21] Appl. No.: 844,326

[22] Filed: Mar. 26, 1986

[51] Int. Cl.⁴ .................................................. B01D 47/00
[52] U.S. Cl. ........................................ 55/227; 55/230; 55/257 HE; 55/259; 261/92; 261/152
[58] Field of Search ................ 55/226, 227, 230, 258, 55/259, 222, 257 HE; 261/92, 152

[56] References Cited

U.S. PATENT DOCUMENTS

| | | | |
|---|---|---|---|
| 1,927,869 | 9/1933 | Downs | 55/222 |
| 2,013,270 | 9/1935 | Grady | 261/92 |
| 2,428,842 | 10/1947 | Feinberg | 261/36 |
| 2,841,369 | 7/1958 | Carraway | 261/92 |
| 3,487,607 | 1/1970 | Cox | 55/222 |
| 3,627,126 | 6/1972 | Goettle | 55/259 |
| 3,719,353 | 3/1973 | Cherne et al. | 261/90 |
| 3,798,881 | 3/1974 | Schwarz et al. | 55/230 |
| 3,856,487 | 12/1974 | Perez | 55/226 |
| 3,948,627 | 4/1976 | Schwarz et al. | 55/230 |
| 3,993,448 | 11/1976 | Lowery | 55/227 |
| 4,299,601 | 11/1981 | Schlachet | 55/230 |
| 4,452,615 | 6/1984 | Schlachet | 55/227 |

Primary Examiner—Bernard Nozick
Attorney, Agent, or Firm—Sidney W. Millard

[57] ABSTRACT

An air conditioning system includes a chamber having an inlet and an outlet. Within the chamber is conditioning apparatus which includes an electric motor, an open top reservoir of water, a disc on the electric motor which dips into the water reservoir to fling a curtain of water across the chamber and a plurality of filters to clean, cool humidify and homogenize the air exiting the chamber.

20 Claims, 6 Drawing Figures

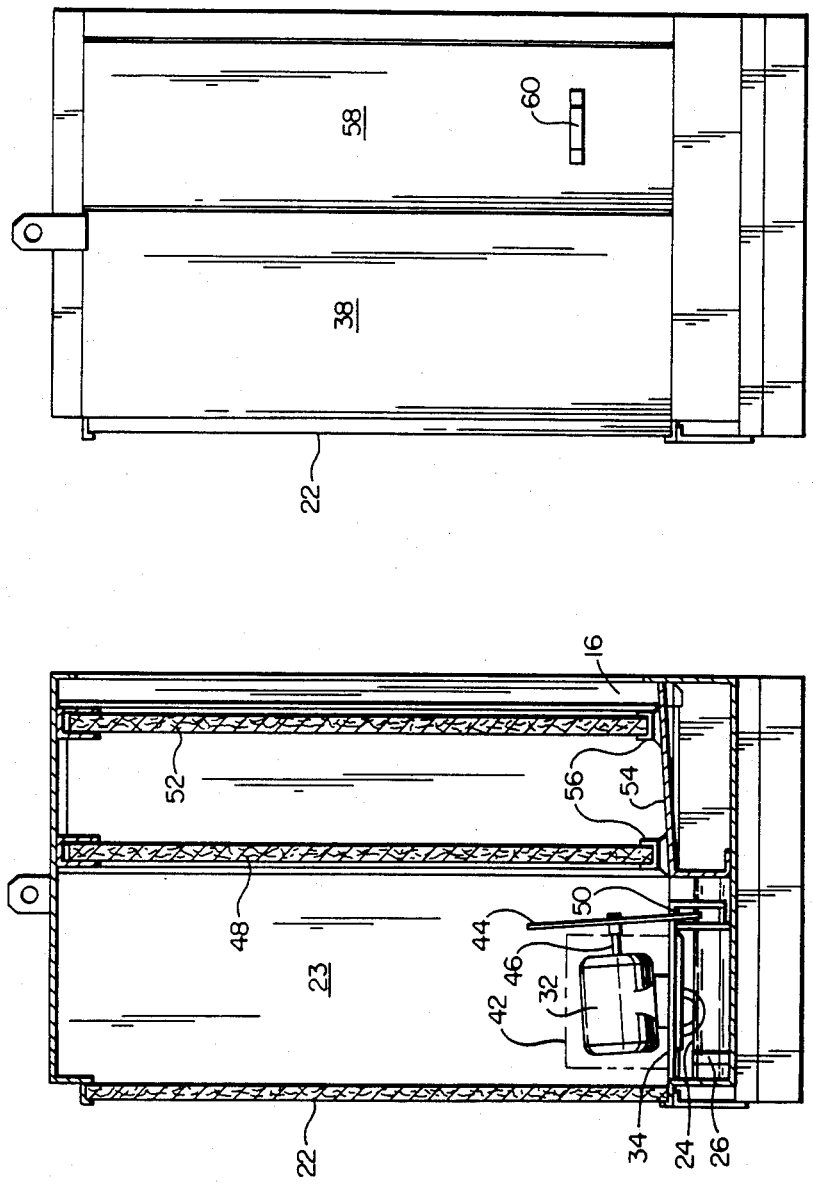

APPARATUS FOR CLEANING AND CONDITIONING GAS

FIELD OF THE INVENTION

This invention relates to cleaning and cooling and humidifying or heating gas prior to its incorporation into another system.

BACKGROUND OF THE INVENTION

Using water to spray across the flow path of a gas, particularly air, as it traverses a housing or chamber for the purpose of filtering, washing and cooling the gas takes many forms. In some cases nozzles are mounted around the periphery of the chamber to spray water toward its center. In other cases, a foraminous wall receives water sprayed or trickled from above such that it flows downward by gravity as the gas passes therethrough. Additionally, numerous patents disclose a rotating drum, cylinder or disc mounted either parallel or perpendicular to the flow of gas. The rotating drum, etc. flings water in a pattern across the flow path of gas passing through the chamber and the water tends to clean and cool the air.

There are three basic types of rotary spraying apparatus known in the art, namely smooth cylinders, smooth discs, and patterned or toothed discs; the latter comprise discs bearing projections extending out of the plane of the discs.

Smooth cylinders are bulky and so heavy that they are difficult to balance on a shaft revolving at high speed. In addition, since the water or other liquid being sprayed only adheres to the surface of the cylinder by surface tension, the quantity of water sprayed by a smooth cylinder is small relative to the large power needed to rotate a heavy cylinder at high speed.

Smooth discs are lighter and easier to balance than smooth cylinders but spray only a small amount of water. Accordingly, a very large numer of discs may be necessary where large quantities of water have to be sprayed or special apparatus may be required to control the spray.

Toothed discs spray far more water than smooth discs because the projections act as scoops lifting water out of the bath. Unfortunately, the spray produced by known apparatus using toothed discs lacks uniformity, both as regards to the sizes of individual droplets within the spray and the angular dispersion of the spray.

SUMMARY OF THE INVENTION

As used herein the terms "gas" or "air" may mean ambient air but could mean any combination or mixture of gases used in an industrial system.

An enclosed chamber in the herein described industrial apparatus has an inlet, an outlet and a blower in the system located downstream of the outlet to draw gas through the chamber. A foraminous wall extends across the inlet to clean the air of large solid particles. After the gas passes through the inlet past the foraminous wall, it is further cleaned, cooled and humidified by a fog-like curtain of water droplets within the chamber. The curtain of water is formed by a rotating disc which flings droplets of water from an open-topped reservoir in the bottom of the chamber. An electric motor is mounted about two-thirds of the way across the inlet opening and it rotates the disc such that the disc dips into a reservoir of water in the bottom of the chamber and upon rising out of the water flings the adhered droplets upwardly in a fan-shaped pattern. The disc is in fact mounted on a shaft of the electric motor and the shaft is inclined upwardly in a direction away from the first foraminous wall at an angle of about 3°.

Downstream of the rotating disc are second and third foraminous walls which extend across the outlet. The second or "wet" foraminous wall is designed to prevent the entrainment of large droplets of water in the stream of gas exiting the chamber through the outlet. Large droplets will impinge on the second foraminous wall and will trickle down the surface and be returned to the open topped reservoir. The third foraminous wall tends to further mix the gases to make a more homogeneous mixture at the point that the gases exit the chamber.

To ensure that water does not collect around the second and third foraminous walls, they are supported on an inclined surface which slopes at an angle of about 2° back toward the open reservoir. To allow easy passage of water which has trickled down the foraminous walls, the lower surfaces of the second and third foraminous walls are supported in relatively short U-shaped channels.

To maintain a proper dispersion of water in the fan-shaped curtain sprayed by the rotating disc, it is necessary to maintain the level of the water in the open reservoir at a relatively constant elevation. As a consequence, two means are provided in the apparatus for controlling the elevation of the water. One of the level control means may be removed to drain the system at such time as it is desired to move the apparatus or repair some equipment.

The cooling aspect of the invention obviously relates to the summer months. In the heating season the same apparatus can be used to heat air for distribution through the same duct work. To facilitate that a vane system and burner are incorporated into the system between the last filter and the distribution duct work. The vane system is structured to increase the lineal velocity of air passing through the system during the heating system and decrease lineal velocity during the cooling season while maintaining a constant volume rate regardless of the season.

Objects of the invention not clear from the above will be understood upon a reading of the detailed description of the preferred embodiment and a review of the drawings as described hereinafter.

BRIEF DESCRIPTION OF THE DRAWINGS

FIG. 3 is a fragmentary sectional view taken along line 3—3 of FIG. 2.

FIG. 4 is a fragmentary side elevational view of the chamber housing the apparatus of this invention taken at a location similar to the location of FIG. 3.

DETAILED DESCRIPTION OF THE PREFERRED EMBODIMENT

Figure 1:
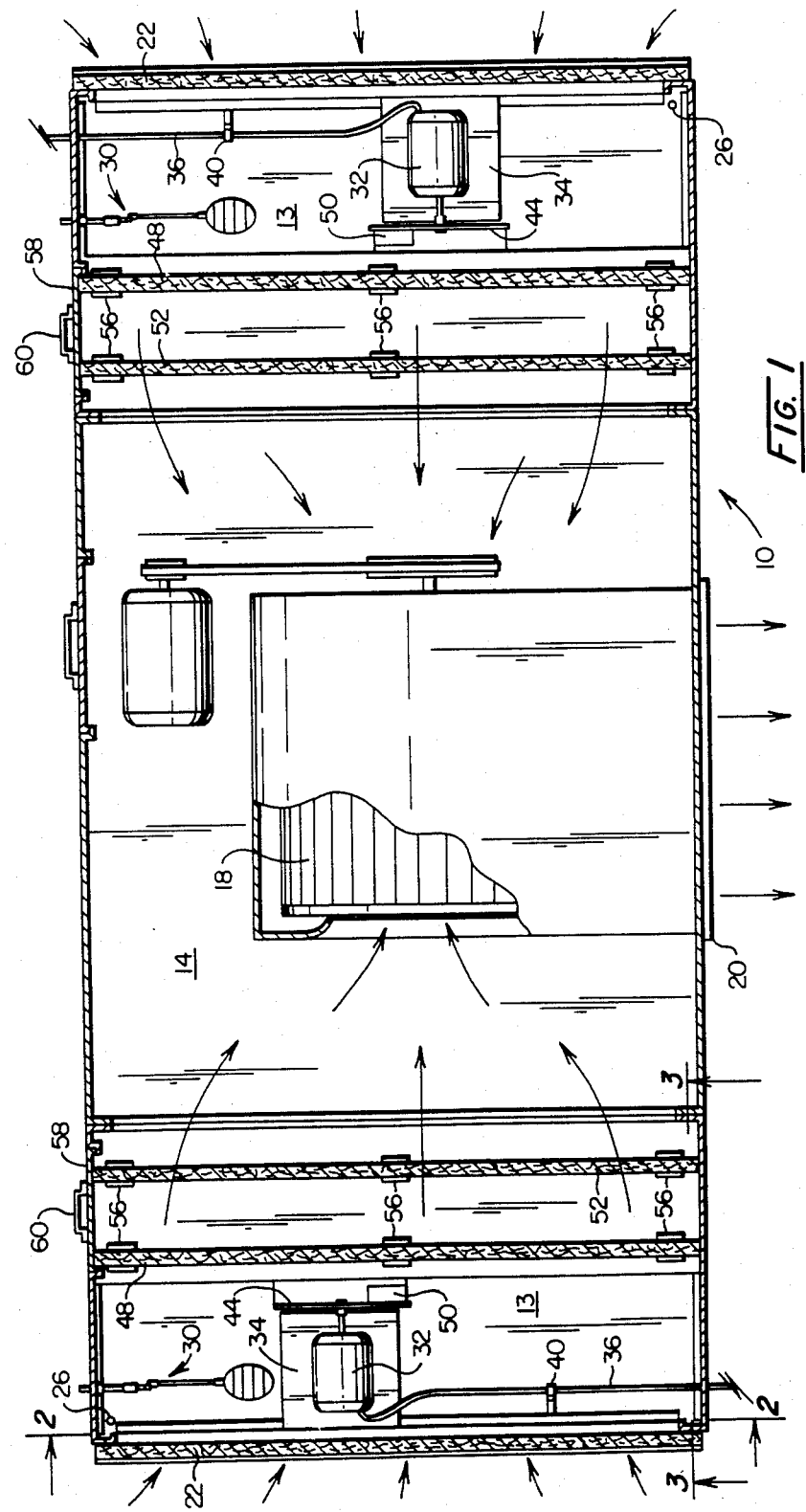
FIG. 1 is a top plan view in section of a chamber which houses the components for cleaning, cooling and humidifying air according to this invention.

In industrial heating and cooling systems, air is fed from the atmosphere through an air modifying system and then through a duct system to where it is desired to discharge the conditioned air. FIG. 1 shows a typical system 10 which may include two or more inlets 12 to a chamber 13 which houses apparatus which will condition the air and discharge it into a plenum chamber 14 through a plurality of outlets 16. Typically a squirrel cage blower 18 will pull air through the system into a plenum chamber 14 and discharge it through a duct system 20. The ultimate use of the conditioned air or gas is not material to this invention.

Since the conditioning apparatus in the chamber 13 are essential identical, only one will be described.

Ambient air is first cleaned of large solid particles by being drawn through a first foraminous wall 22 into a conditioning chamber 13. Within chamber 13, at the bottom, is an open-topped water reservoir with the water level 24 being controlled by two different control mechanisms. The first is a pipe 26 threaded into a drain connection 28 and the second is a float valve 30. The function of a float valve is well known in the industry and will not be described here. The upstanding pipe 26 will take the water overflow when it rises above the top of the pipe and during operation the float valve will usually be structured to cut off only slightly below the top of the pipe 26. The reason for that is to prevent water from flowing constantly into the system where it will be lost to the system. On the other hand, should the float valve 30 malfunction, water will not overflow the water reservoir.

It may be noted in FIG 1 that both float valves 30 are on the same side of the housing. This minimizes piping of feed water and also allows two units to be mounted juxtaposed to each other by providing that the piping is at an exterior wall. It is preferred that both means for controlling the water level be on one side of the motor but it is not required for adequate operation.

To drain the system, one need only unscrew the pipe 26 from the drain outlet 28 and water will flow out of the open-topped reservoir.

Motor 32 is mounted on a platform 34 above the level of the water 24. It is driven by power supplied by an electric cable 36 extending through the sidewall 38 of the conditioning chamber 13. The cable 36 is supported above the water level 24 by a bracket 40. The reason for holding the electric cable out of the water and behind the rotating disc 44 is obvious. To protect the electric motor 32 from water raining down, a housing 42 shown in phantom covers the upper surface. Line 36 could extend through either sidewall.

Figure 2:
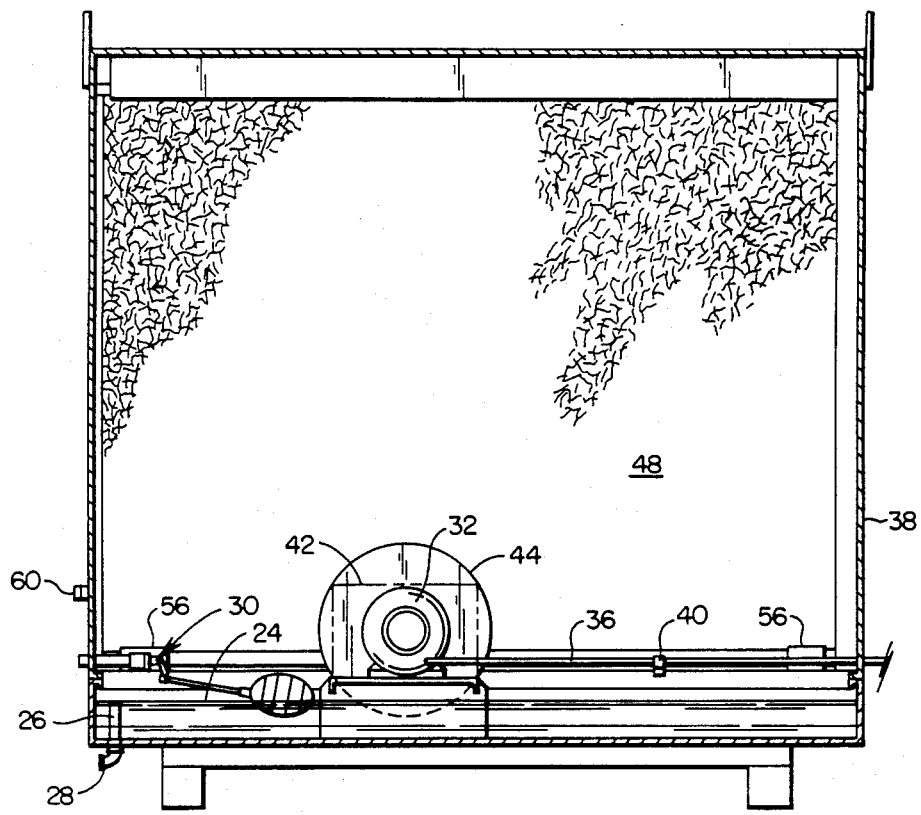
FIG. 2 is an end elevational view in section of one end of the apparatus of FIG. 1.

Looking further to FIG. 2 it will be observed that the axis of motor 32 is about two-thirds of the way from the right-hand side of the inlet. The reason for this is that the disc 44, as shown in FIG. 2, is rotating counter clockwise at about 1,700 RPM and the edge of the disc 44 which first emerges from the water in the reservoir is closest to sidewall 38 and will have the largest concentration of water droplets separating from its periphery. The location of the axis of the motor which has been determined empirically to be the preferable distance is 13/32 from the left-hand side of the inlet opening as shown in FIG. 2 or 19/32 from sidewall 38.

The reason for locating the cable 36 just slightly above the water level 24 is to minimize the length of cable exposed to water spray but still have it at a location easily accessible to workmen when the first foraminous wall 22 is removed or displaced by sliding to the right or left in the channels supporting it in the inlet opening, best seen in FIG. 3.

The disc 44 is mounted on a shaft 46 extending from the motor 32 and the shaft is so mounted in the motor 32 as to be inclined upwardly away from the first foraminous wall 22 at an angle of about 3°. The reason for this is to incline the disc 44 at about 3° from the vertical to have a more uniform fan-like pattern of the water spray or curtain flung from the periphery of the disc as it rotates. Air being drawn through foraminous wall 22 will be pushing the droplets flung from the disc 44 toward a second foraminous wall 48 and the further from the disc 44 the droplets travel the more they will be pushed toward wall 48. Thus, the 3° inclination will allow more vaporization and atomization of the droplets in the air passing through the chamber before the droplets are pushed into the wall 48. The result is air with a more uniform humidity and temperature. The drawings illustrate the platform 34 as horizontal with the motor 32 tilted. The alternative is to tilt the platform 34 the preferred 3°.

A means for controlling the droplet size and atomization of the water is partially controlled by an atomizing structure 40 and for purposes of understanding its function and structure, to the extent necessary for a complete understanding of this invention, a description of the same from U.S. Pat. No. 4,299,601 is incorporated herein by reference.

The second foraminous wall 48 is designed to collect large droplets of water flung by the disc 44 into the conditioning chamber 13 which have not vaporized. The inherent conditions of the chamber 13 ensure that this second foraminous wall or "wet wall" 48 be quite moist and this moisture will assist in the cleaning, cooling and humidifying function of the gas conditioning system. Large droplets of water which impinge on wall 48 will trickle down the wall and return to the reservoir.

A third foraminous wall 52 is downstream of the wall 48 adjacent the outlet to chamber 13 and its function is to further humidify and clean the air passing therethrough and to cause it to have a more homgenous nature as it passes out of the chamber. Any large droplets not collected by wall 48 will be collected by wall 52.

Note that both foraminous walls 48 and 52 are supported on a planar shelf 54 which is inclined at an angle of about 2° back toward the reservoir so that any water trickling down either foraminous wall will flow back toward the reservoir and not be entrained in the gas exiting to the duct system 20.

As with any conventional filters or foraminous walls used in industry, their periphery is supported in a rigid metal frame designed to hold its shape. Holes are formed in the frame to allow any water trickling down the walls to pass on through the frames and not be collected therein. The lower part of these frames of walls 48 and 52 are supported in channels 56 which are relatively short in length as compared to the length of the foraminous wall which they support. The relative length of the channels 56 is best seen in FIG. 1. The reason for the relatively short lengths of channels 56 and their slight elevation above the surface 54, best seen in FIG. 3, is to allow the easy flow path from the bottom of the foraminous wall down the slope of surface 54 toward to the reservoir.

Looking now to FIG. 4, it will be observed that the compartment where the water reservoir is located is behind the left-hand side of the exterior surface of the chamber. The right-hand side is screened by a door 58. Door 58 is closed by hand by sliding it upwardly into a slot and swinging it forward toward the interior of the chamber to allow the bottom edge of the door to slide into place in a slot in the bottom section. This is all accomlished very easily by the handle 60. Removing the door 58 allows the easy removal and replacement of foraminous walls 48 and 52 without the necessity of completely disassembling the whole apparatus. Note that both such doors 58 illustrated in FIG. 1 are in the same wall. This allows another identical air conditioning unit to be mounted as a mirror image to the one shown with the juxtaposed walls of the units being those remote from doors 58. It should be observed that the direction of flow to the duct system 20 is optional.

Figure 5:
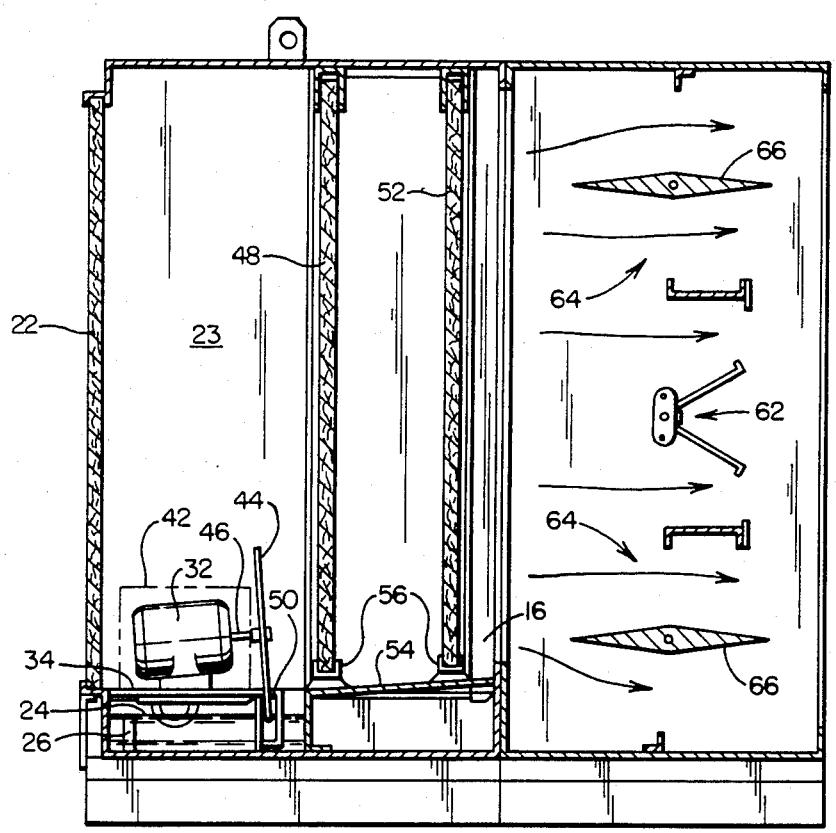
FIG. 5 is a sectional view similar to FIG. 3 and incorporating a vane system and a gas burner, the vanes being open as during the cooling system.
Figure 6:
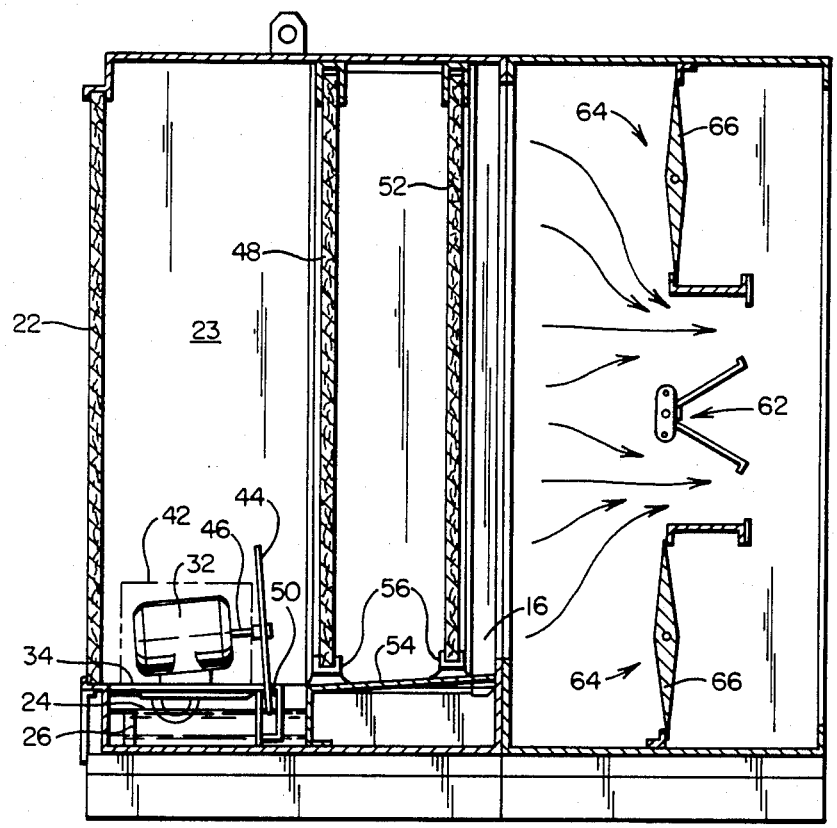
FIG. 6 is a sectional view similar to FIG. 5 but with the vanes closed as during the heating system.

Turning now to FIGS. 5 and 6, an alternative embodiment incorporates a gas burner 62 locted in the flow path downstream of the third filter 52 but upstream of the blower 18. Obviously, the burner is used only during the heating season. The humidifying system described previously may be used in combination with the burner where desired.

FIG. 5 illustrates a vane system 64 involving two horizontally mounted vanes 66 designed to open during the cooling season. FIG. 6 illustrates the vanes rotated 90° to the closed position where the burner 62 is operating.

The vanes 64 are used in combination with the blower 18 to adjust the lineal velocity of air passing the burner 62. Blower 18 delivers a substantially constant volume of air to the duct system 20. In the overall combination of apparatus of this invention, when the vanes 66 are open as illustrated in FIG. 5, the lineal velocity of air should be about six hundred fifty feet per minute. This allows a relatively slow passage through the filters 22, 48, 52, with a relatively uniform temperature and humidity.

However, during the heating system there is a need for greater turbulence adjacent the heater 62 to thereby increase the heat transferred to the air. To increase turbulence at the heater area the vanes are closed as illustrated in FIG. 6. The effective cross-sectional area of air passage through the region of the vane system 64 with the vanes closed is about one-fifth the cross-sectional area when the vanes are open. The desired lineal velocity of air at the vane system 64 with the vanes closed is about three thousand feet per minute.

Having thus described the invention in its preferred embodiments, it will be clear that certain modifications may be made in the structure as shown without departing from the spirit of the invention. It is not intended that the words used in the specification to described the preferred embodiments nor the drawings showing the same be limiting on the invention. Rather, it is intended that the invention be limited only by the scope of the appended claims.

We claim:

1. Apparatus for cleaning, cooling and humidifying gas comprising, means forming a chamber having an inlet and an outlet, a first foraminous wall extending across the inlet to filter large solid particles from gas entering the chamber through the inlet, an open top water reservoir in the bottom of the chamber adjacent the first foraminous wall, said reservoir being filled with water to a predetermined level, two means for controlling the water level, an electric motor in the chamber mounted above the water level adjacent the first foraminous wall, said motor having a rotable shaft projecting away from said first foraminous wall at an upwardly extending angle of about 3°, a disc mounted on the end of the shaft most remote from the first foraminous wall, said disc having a diameter sufficiently great as to extend below the surface of the water and, upon rotation of said shaft, to fling droplets of water from the reservoir upwardly to form a wet curtain of water droplets across the chamber generally paralle to said wall and thereby clean, cool and humidify gas passing from the inlet to the outlet, means for adjusting the size of the water droplets flung from the disc, means for pulling gas from the inlet through the outlet, second and third foraminous walls extending across the chamber between the disc and the outlet, the second foraminous wall being nearest the disc and serving to filter large water droplets from the gas moving toward the outlet, the third foraminous wall being spaced from this second foraminous wall and farthest from the disc, both the second and third foraminous walls being supported on a surface sloping downwardly toward said reservoir whereby water droplets trickling down the second and third foraminous walls will flow down the sloping surface and return to the reservoir.

2. The apparatus of claim 1 wherein the shaft of the electric motor is offset from the center of the inlet in a direction opposite from the side of the disc which first rises from the water when the shaft is rotating.

3. The apparatus of claim 1 wherein the two means for controlling the water level are both located to one side of the shaft, an electrical cable extending from an opening in the means forming the chamber above the reservoir to the electric motor, a clamp extending from the means forming the chamber to a location above the reservoir and holding the cable above the water level.

4. The apparatus of claim 1 wherein the sloping surface is substantially planar and slopes at an angle of about 2°.

5. The apparatus of claim 4 wherein the second and third foraminous walls are each supported on the surface by a plurality of channels, each said channel being short in length relative to the length of the foraminous wall to thereby allow water to flow down the sloped surface between the channels in relatively unobstructed fashion.

6. The apparatus of claim 5 wherein the shaft of the electric motor is offset from the center of the inlet in a direction opposite from the side of the disc which first rises from the water when the shaft is rotating.

7. The apparatus of claim 6 wherein the two means for controlling the water level are both located to one side of the shaft,
  an electrical cable extending from an opening in the means forming the chamber above the reservoir to the electric motor,
  a clamp extending from the means forming the chamber to a location above the reservoir and holding the cable above the water level.

8. The apparatus of claim 7 including a vertically slideable door in an aperture in the means forming the chamber,
  the aperture being of a size to allow the removal and replacement of the second and third foraminous walls without moving the reservoir, disc or motor.

9. The apparatus of claim 8 including means for draining the reservoir by removing one of said means for controlling the water level.

10. The apparatus of claim 1 wherein the second and third foraminous walls are each supported on the surface by a plurality of channels, each said channel being short in length relative to the length of the foraminous wall to thereby allow water to flow down the sloped surface between the channels in relatively unobstructed fashion.

11. The apparatus of claim 10 wherein the shaft of the electric motor is offset from the center of the inlet in a direction opposite from the side of the disc which first rises from the water when the shaft is rotating.

12. The apparatus of claim 11 wherein the two means for controlling the water level are both located to one side of the shaft,
  an electrical cable extending from an opening in the means forming the chamber above the reservoir to the electric motor,
  a clamp extending from the means forming the chamber to a location above the reservoir and holding the cable above the water level.

13. The apparatus of claim 12 including a vertically slideable door in an aperture in the means forming the chamber,
  the aperture being of a size to allow the removal and replacement of the second and third foraminous walls without moving the reservoir, disc or motor.

14. The apparatus of claim 13 including means for draining the reservoir by removing one of said means for controlling the water level.

15. The apparatus of claim 4 wherein the shaft of the electric motor is offset from the center of the inlet in a direction opposite from the side of the disc which first rises from the water when the shaft is rotating.

16. The apparatus of claim 15 wherein the two means for controlling the water level are both located to one side of the shaft,
  an electrical cable extending from an opening in the means forming the chamber above the reservoir to the electric motor,
  a clamp extending from the means forming the chamber to a location above the reservoir and holding the cable above the water level.

17. The apparatus of claim 16 including a vertically slideable door in an aperture in the means forming the chamber,
  the aperture being of a size to allow the removal and replacement of the second and third foraminous walls without moving the reservoir, disc or motor.

18. The apparatus of claim 17 including means for draining the reservoir by removing one of said means for controlling the water level.

19. Apparatus for conditioning air including, means forming a chamber having an inlet and an outlet,
  a first foraminous wall extending across the inlet to filter large solid particles from gas entering the chamber through the inlet,
  an open top water reservoir in the bottom of the chamber adjacent the first foraminous wall,
  an electric motor in the chamber mounted above the water level adjacent the first foraminous wall, said motor having a rotable shaft projecting away from said first foraminous wall at an upwardly extending angle of about 3°,
  a disc mounted on the end of the shaft most remote from the first foraminous wall,
  means for pulling gas from the inlet through the outlet,
  second and third foraminous walls extending across the chamber between the disc and the outlet,
  means forming a vane system in said chamber between the third filter and the outlet for controlling the lineal velocity of air as it passes the vane system.

20. The apparatus of claim 19 including a heater means adjacent the vane system means for heating air as it passes the vane system.

* * * * *